United States Patent Office 2,771,996
Patented Nov. 27, 1956

2,771,996

METHOD OF ACCELERATING THE SPEED OF SEDIMENTATION OF PARTICLES WITH DISPERSED CAROB BEAN FLOUR

Georges Hulot, Paris, France, assignor to Societe d'Etudes Chimiques pour l'Industrie et l'Agriculture, Paris, France No Drawing. Application September 21, 1951, Serial No. 247,746

Claims priority, application France September 23, 1950

3 Claims. (Cl. 210—42.5)

This invention relates to a method of accelerating the speed of sedimentation of solid particles contained in solutions of electroyltes.

In order to accelerate the speed of sedimentation in a liquid, of solid particles not charged electrically (flocculated) it is known in general that one should seek to promote as far as possible agglomeration of the particles into the form of micelles as large as possible.

In fact the speed of sedimentation is connected with the equivalent diameters of the particles (diameters measured in accordance with Stokes' law) with the viscosity of the liquid and with the difference in the densities of the solid and the liquid. When deflocculated particles (electrically charged particles) are present flocculation (discharge of the particles) is first induced by the addition of suitably selected electrolytes. This induces an agglomeration into the form of micelles and it may be necessary to cause the latter to increase in size.

Certain products which will be referred to hereinafter under the term "collector agents" make it possible to increase considerably the size of the micelles obtained.

The present invention relates to a process in which, in order to accelerate the sedimentation of solid particles in brines which are rich in salts or in solutions of an electrolyte, use is made of a product consisting of carob bean flour treated in a particular way. In fact, starting from carob bean flour it is possible under certain conditions to obtain a product which possesses all the desired properties.

The same is true of the product designated by the name white carob bean gum.

According to the invention the carob beans are pulverized to give flour. The gum can also be extracted to give white carob bean gum. In order to use the flour for the process of the present invention it is not essential to purify it or to submit it to any refining step. A start can be made from carob bean flour obtained by pulverizing the grains since the colouration is of little importance; this is obviously a substantial economic advantage.

A start can also be made from impure carob bean flour, for example flour containing a certain proportion of mineral or organic matter.

The collector agent is prepared by treating crude carob bean flour with a solution of electrolytes to give a colloidal solution of high viscosity. It is observed that in general the higher the viscosity the greater is the collecting power. For this treatment it has been found that the electrolytes which give the best results are solutions of boric acid and its salts, with or without salts of phosphoric acid. In certain cases, tannin can also be used. The collector agent is prepared in the heat, and the temperature can vary from 70 to 130° C. The heating time varies with the temperature. The salt can be added before, during or after heating and cooling. Aging of the solution may sometimes be necessary.

The nature of the salt to be used for the treatment of the carob bean flour varies in accordance with the nature of the salts contained in the brine to be treated. In fact it has been observed that if carob bean flour is treated with one of the electrolytes contained in the brine to be treated the flour prepared in this way sometimes seems less sensitive to their action when it is introduced into the brine.

In order to avoid any flocculation of the collector agent when it is added to the brine to be treated, it is sometimes preferable to use buffered media during the preparation.

The quantities of collector agent to be added are small. They depend on the concentration of insoluble particles, on the surface of the particles and on the sedimentation medium; they are determined by experiment.

In all cases the introduction of a small quantity of carob bean flour treated by the process of the present invention makes it possible in general to obtain a speed of sedimentation higher than that which can be obtained by the addition of known flocculants such as soluble starch, sodium silicate, aluminum sulphate or untreated carob gum. The collector agent has also the advantage that it can be used with success in brines of a very low pH (1 to 2, for example).

The invention can be applied in all cases where it is desired to accelerate the speed of sedimentation of particles and in particular to the separation of clay from brines containing potassium and sodium chlorides, to the elimination of phosphate residues from brines containing monocalcium phosphate, to the sedimentation of slimes and to the treatment of colliery washing waters.

The following examples show how the process of the invention may be carried into effect:

*Example I*

500 gms. of crude carob bean flour are made up with 50 litres of distilled water. This solution is treated with 50 litres of a solution containing:

30 litres of a solution of M/5 boric acid,
4 litres of a solution of M/5 sodium hydroxide,
30 litres of a solution of M/5 potassium chloride, and the mixture is heated to boiling for one minute. The colloidal solution thus obtained is used for accelerating the sedimentation of clay in a brine containing potassium and sodium chlorides.

The addition of 5 mgms. per litre of the collector agent to a solution containing, for example, 20 gms. per litre of clay suffices to triple the speed of sedimentation as compared to that obtained without the addition of the collector agent.

*Example II*

500 gms. of crude carob bean flour are made up with 50 litres of distilled water. This solution is treated at a temperature of 90° C. for 10 minutes with 50 litres of a solution containing:

30 litres of a solution of M/5 boric acid,
4 litres of a solution of M/5 sodium hydroxide, and
2 litres of a solution of M/5 disodium phosphate.

This collector agent can be used in the same way as that of Example I. It can also be used for accelerating the speed of sedimentation of phosphate residues in said brines containing monocalcium phosphate.

It will be apparent, therefore, that the collector agent above-described, makes it possible to accelerate the speed of sedimentation of solid inorganic particles suspended in aqueous solutions of electrolytes, and thus more rapidly to separate the suspended particles from the solution as a result of the increase in the speed of sedimentation thereof.

What I claim is:

1. A method of accelerating the speed of sedimentation of solid inorganic particles suspended in aqueous solutions of electrolytes which comprises adding to said solutions as collector agent a colloidal carob bean flour solution prepared by distributing carob bean flour in water and heating the same with a solution of boric acid at a temperature of 70° to 130° C. to effectuate sedimentation of said suspended inorganic particles and separating the thus sedimented particles from the solutions.

2. A method of accelerating the speed of sedimentation of solid inorganic particles suspended in aqueous solutions of electrolytes, including potassium chloride, which comprises adding to said solutions as collector agent a colloidal carob bean flour solution prepared by distributing about 500 gms. of carob bean flour in 50 litres of water to obtain a solution thereof; and heating said solution with 50 litres of a solution containing 30 litres of a solution of M/5 boric acid, 4 litres of a solution of M/5 sodium hydroxide and 30 litres of a solution of M/5 potassium chloride and heating the same to boiling for one minute, to effectuate sedimentation of said suspended inorganic particles and separating the thus sedimented particles from the solutions.

3. A method of accelerating the speed of sedimentation of solid inorganic particles suspended in aqueous solutions of electrolytes, which comprises adding to said solutions as collector agent a colloidal carob bean flour solution prepared by dissolving 500 gms. of carob bean flour in 50 litres of water; adding to said solution 50 litres of a solution containing 30 litres of a solution of M/5 boric acid, 4 litres of a solution of M/5 sodium hydroxide and 2 litres of a solution of M/5 disodium phosphate, and heating said mixture at a temperature of 90° C. for ten minutes, to effectuate sedimentation of said suspended inorganic particles and separating the thus sedimented particles from the solutions.

References Cited in the file of this patent
UNITED STATES PATENTS

| | | |
|---|---|---|
| 531,377 | Hanson et al. | Dec. 25, 1894 |
| 566,497 | Castle | Aug. 25, 1896 |
| 2,122,483 | Menaul | July 5, 1938 |
| 2,144,522 | Braun | Jan. 17, 1939 |
| 2,149,843 | Frick | Mar. 7, 1939 |
| 2,264,448 | Moller | Dec. 2, 1941 |
| 2,351,259 | Fuetterer | June 13, 1944 |
| 2,376,885 | Sherwood | May 29, 1945 |
| 2,393,269 | Rudolfs et al. | Jan. 22, 1946 |
| 2,644,762 | Frisch et al. | July 7, 1953 |
| 2,644,765 | Frisch et al. | July 7, 1953 |

FOREIGN PATENTS

| | | |
|---|---|---|
| 566,394 | Great Britain | Dec. 28, 1944 |

OTHER REFERENCES

Yancy et al.: Flocculation as an Aid in the Clarification of Coal Washery Water, Bureau of Mines Report of Investigations, No. 3494, February 1940, pages 4, 5, 8 and 9.

Howes: Vegetable Gums and Resins, pub. 1949, Chromica Botanica Co., Waltham, Mass., pages 44–47.